(12) United States Patent
Shiau et al.

(10) Patent No.: US 12,085,803 B2
(45) Date of Patent: Sep. 10, 2024

(54) BACKLIGHT MODULE AND DISPLAY APPARATUS

(71) Applicant: Coretronic Corporation, Hsin-Chu (TW)

(72) Inventors: Tzeng-Ke Shiau, Hsin-Chu (TW); Shih-Yen Cheng, Hsin-Chu (TW); Jung-Wei Chang, Hsin-Chu (TW); Chun-Wei Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/179,384

(22) Filed: Mar. 7, 2023

(65) Prior Publication Data

US 2023/0288753 A1 Sep. 14, 2023

(30) Foreign Application Priority Data

Mar. 11, 2022 (CN) .......................... 202220521242.5

(51) Int. Cl.
*G02F 1/13357* (2006.01)
*F21V 8/00* (2006.01)
*G02F 1/1335* (2006.01)

(52) U.S. Cl.
CPC ..... *G02F 1/133603* (2013.01); *G02B 6/0053* (2013.01); *G02B 6/0076* (2013.01); *G02F 1/133607* (2021.01); *G02F 1/133615* (2013.01)

(58) Field of Classification Search
CPC ......... G02F 1/133603; G02F 1/133607; G02F 1/133615; G02F 1/133627;
(Continued)

(56) References Cited

U.S. PATENT DOCUMENTS

2008/0112187 A1* 5/2008 Katsumata ........... G02B 6/0076
362/611
2008/0198295 A1* 8/2008 Yuuki .................. G02B 6/0053
362/235
(Continued)

FOREIGN PATENT DOCUMENTS

TW 1589966 B * 7/2017
TW 201930936 8/2019
(Continued)

OTHER PUBLICATIONS

"Search Report of Europe Counterpart Application", issued on Jun. 21, 2023, p. 1-p. 9.

*Primary Examiner* — Erin Kryukova
(74) *Attorney, Agent, or Firm* — JCIPRNET

(57) ABSTRACT

A backlight module including a first light guide plate, a first light source, a diffusor, a second light guide plate, a second light source, a viewing angle control film, and a first prism sheet is provided. The diffusor is disposed on one side of a first light emitting surface of the first light guide plate. The second light guide plate is disposed on one side of a first bottom surface of the first light guide plate. A second light emitting surface of the second light guide plate faces the first bottom surface. The second light source is disposed on one side of a second light incident surface of the second light guide plate. The viewing angle control film is disposed between the first light guide plate and the second light guide plate. The first prism sheet is disposed between the viewing angle control film and the first light guide plate.

19 Claims, 17 Drawing Sheets

(58) Field of Classification Search
CPC ............ G02F 1/133626; G02B 6/0053; G02B 6/0076; G02B 6/0038; G02B 6/0036
See application file for complete search history.

(56) References Cited

U.S. PATENT DOCUMENTS

| | | | |
|---|---|---|---|
| 2012/0235891 A1* | 9/2012 | Nishitani | ............ G02F 1/1323 345/102 |
| 2017/0153383 A1* | 6/2017 | Lee | ............ G02B 6/0068 |
| 2021/0191027 A1 | 6/2021 | Liao et al. | |

FOREIGN PATENT DOCUMENTS

| | | | |
|---|---|---|---|
| TW | I725727 | 4/2021 | |
| TW | 202138886 | 10/2021 | |
| WO | WO-2018141823 A1 * | 8/2018 | ............ G02B 6/0076 |
| WO | WO-2021131792 A1 * | 7/2021 | ............ G02B 5/3016 |

* cited by examiner

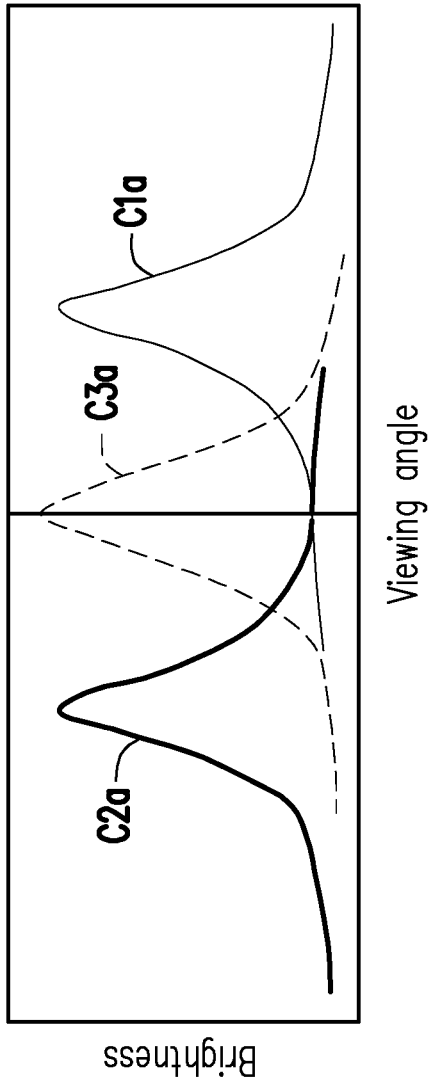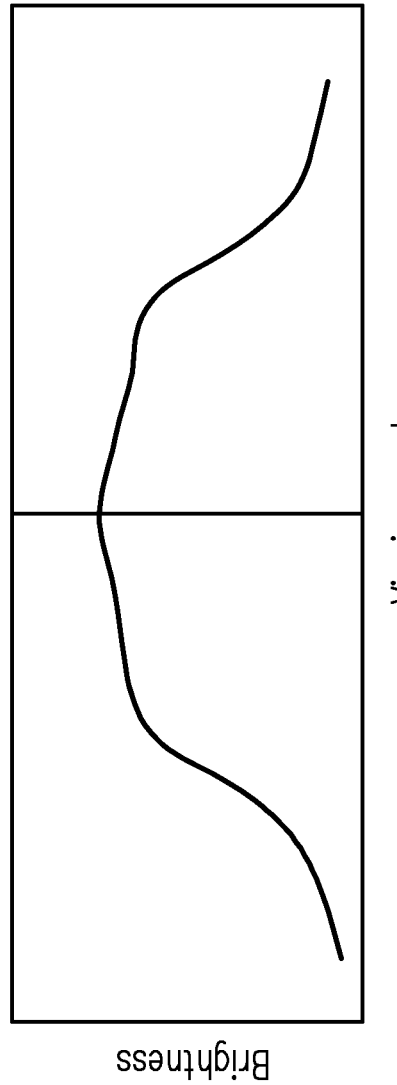

BACKLIGHT MODULE AND DISPLAY APPARATUS

CROSS-REFERENCE TO RELATED APPLICATION

This application claims the priority benefit of China application serial no. 202220521242.5, filed on Mar. 11, 2022. The entirety of the above-mentioned patent application is hereby incorporated by reference herein and made a part of this specification.

BACKGROUND

Technical Field

The disclosure relates to a backlight module and a display apparatus, and in particular, to a backlight module and a display apparatus with two light guide plates.

Description of Related Art

Generally speaking, in order to allow multiple viewers to watch together, a display apparatus usually has a display effect of a wide viewing angle. However, in some situations or occasions, such as browsing private web pages, confidential information or entering passwords in public, the display effect of the wide viewing angle is likely to cause the screen to be peeped by others, resulting in leakage of confidential information. In order to achieve a privacy protection effect, the general practice is to place a light control film (LCF) in front of the display panel to filter out large-angle light. In addition, for the switching convenience of the privacy protection function, an electronically controlled diffusion film may further be disposed above the LCF. When the privacy protection is not required, the electronically controlled diffusion film is controlled in a scattering state, so that the small-angle light from the LCF can be dispersed to a larger viewing angle range through the scattering of the electronically controlled diffusion film. However, such an approach will cause the light energy of the light source not to be effectively utilized. Therefore, how to develop a display apparatus with extremely convenient viewing angle switching and better light energy utilization rates of the backlight module has become an important subject for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a backlight module, which has a better light energy utilization rate.

The disclosure provides a display apparatus, which has better light energy utilization rates in both a sharing mode and a privacy protection mode.

Other objectives and advantages of the disclosure can be further understood from the technical features disclosed in the disclosure.

In order to achieve one or part or all of the above objectives or other objectives, an embodiment of the disclosure proposes a backlight module. The backlight module includes a first light guide plate, a first light source, a diffusor, a second light guide plate, a second light source, a viewing angle control film, and a first prism sheet. The first light guide plate has a first light incident surface, a first bottom surface, and a first light emitting surface. The first bottom surface and the first light emitting surface are connected to the first light incident surface and opposite to each other. The first light source is disposed on one side of the first light incident surface of the first light guide plate. The diffusor is disposed on one side of the first light emitting surface of the first light guide plate. The second light guide plate is disposed on one side of the first bottom surface of the first light guide plate. The second light guide plate has a second light incident surface, a second bottom surface, and a second light emitting surface. The second bottom surface and the second light emitting surface are connected to the second light incident surface and opposite to each other. The second light emitting surface faces the first bottom surface. The second light source is disposed on one side of the second light incident surface of the second light guide plate. The viewing angle control film is disposed between the first light guide plate and the second light guide plate. The first prism sheet is disposed between the viewing angle control film and the first light guide plate.

In order to achieve one or part or all of the above objectives or other objectives, an embodiment of the disclosure proposes a display apparatus. The display apparatus includes a backlight module and a display panel. The backlight module includes a first light guide plate, a first light source, a diffusor, a second light guide plate, a second light source, a viewing angle control film, and a first prism sheet. The first light guide plate has a first light incident surface, a first bottom surface, and a first light emitting surface. The first bottom surface and the first light emitting surface are connected to the first light incident surface and opposite to each other. The first light source is disposed on one side of the first light incident surface of the first light guide plate. The diffusor is disposed on one side of the first light emitting surface of the first light guide plate. The second light guide plate is disposed on one side of the first bottom surface of the first light guide plate. The second light guide plate has a second light incident surface, a second bottom surface, and a second light emitting surface. The second bottom surface and the second light emitting surface are connected to the second light incident surface and opposite to each other. The second light emitting surface faces the first bottom surface. The second light source is disposed on one side of the second light incident surface of the second light guide plate. The viewing angle control film is disposed between the first light guide plate and the second light guide plate. The first prism sheet is disposed between the viewing angle control film and the first light guide plate. The display panel is disposed on one side of the first light emitting surface of the first light guide plate and overlaps the first light emitting surface and the second light emitting surface.

Based on the above, in the backlight module and the display apparatus according to an embodiment of the disclosure, the first prism sheet is disposed between the first light guide plate and the second light guide plate which are disposed overlapping each other. When the display apparatus operates in the sharing mode, the first prism sheet can reflect part of the light emitted from the first bottom surface of the first light guide plate back to the first light guide plate, so as to increase the light energy utilization rate of the first light source. When the display apparatus operates in the privacy protection mode, the first prism sheet can further increase the light collection of the light from the second light guide plate, so as to improve the forward luminance of the display apparatus. In addition, disposing the viewing angle control film between the two light guide plates may effectively reduce the risk that the light emitted by the first light source of the display apparatus is absorbed by the viewing angle control film when the display apparatus operates in the sharing mode, which helps to improve the light energy utilization rate of the backlight module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A is a schematic diagram illustrating the distribution of the brightness of light emitted by different light sources versus the viewing angle of the display apparatus operating in the sharing mode according to the first embodiment of the disclosure.

FIG. 6B is a schematic diagram illustrating the distribution of the total brightness versus the viewing angle of the display apparatus operating in the sharing mode according to the first embodiment of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
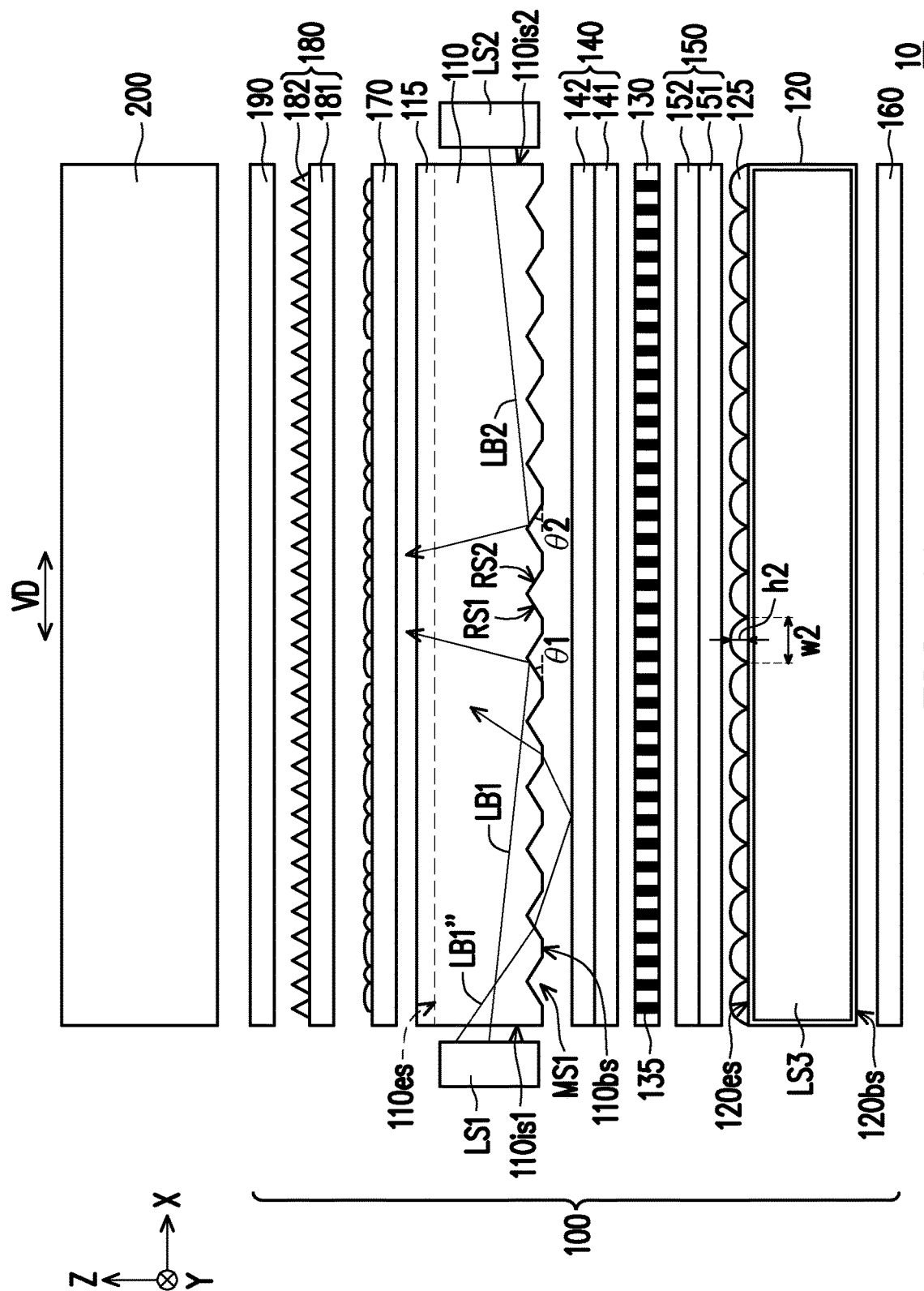
FIGS. 1A and 1B are schematic side views of the display apparatus according to a first embodiment of the disclosure in different directions, respectively.
Figure 1B:
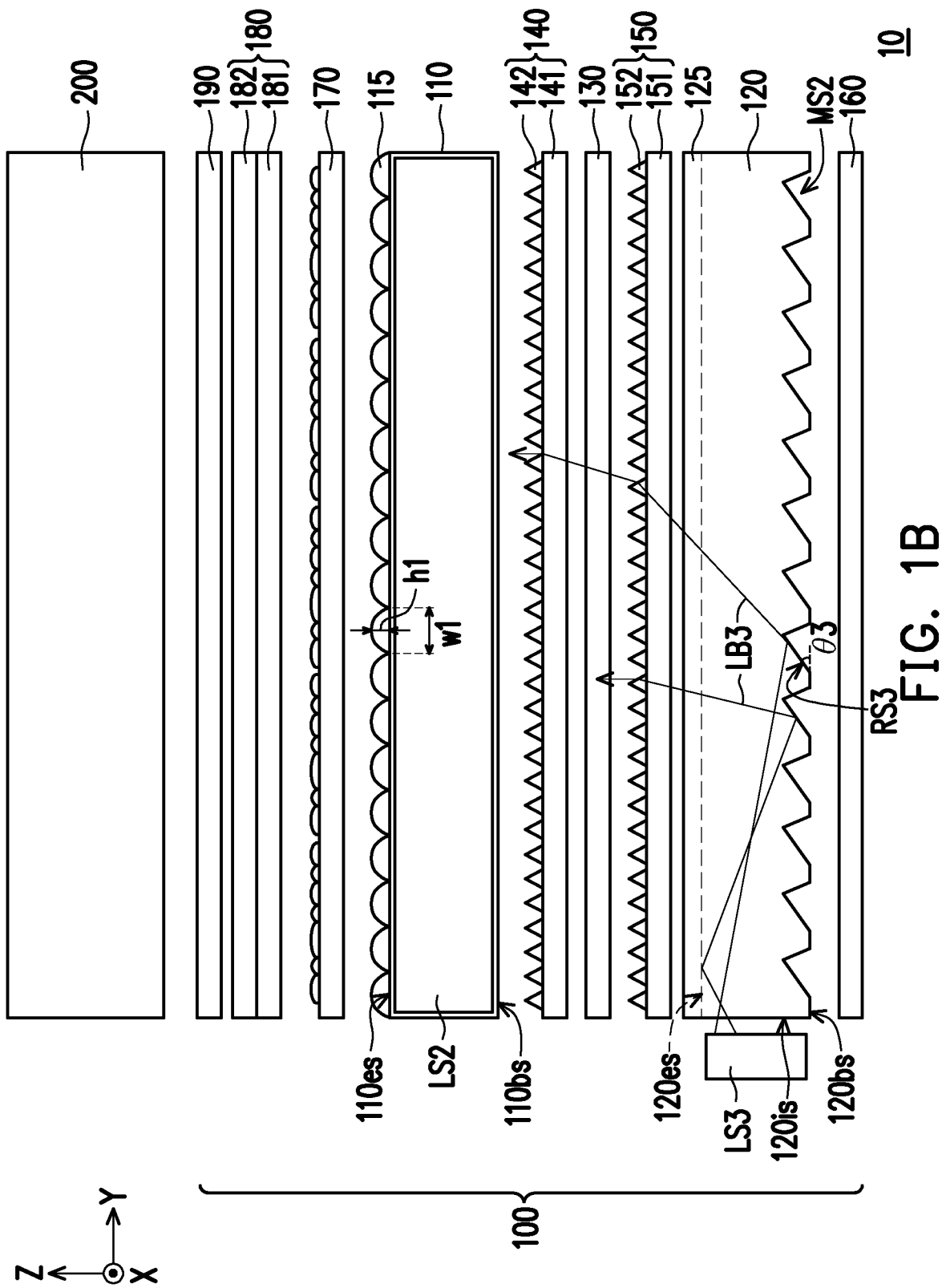
Figure 2:
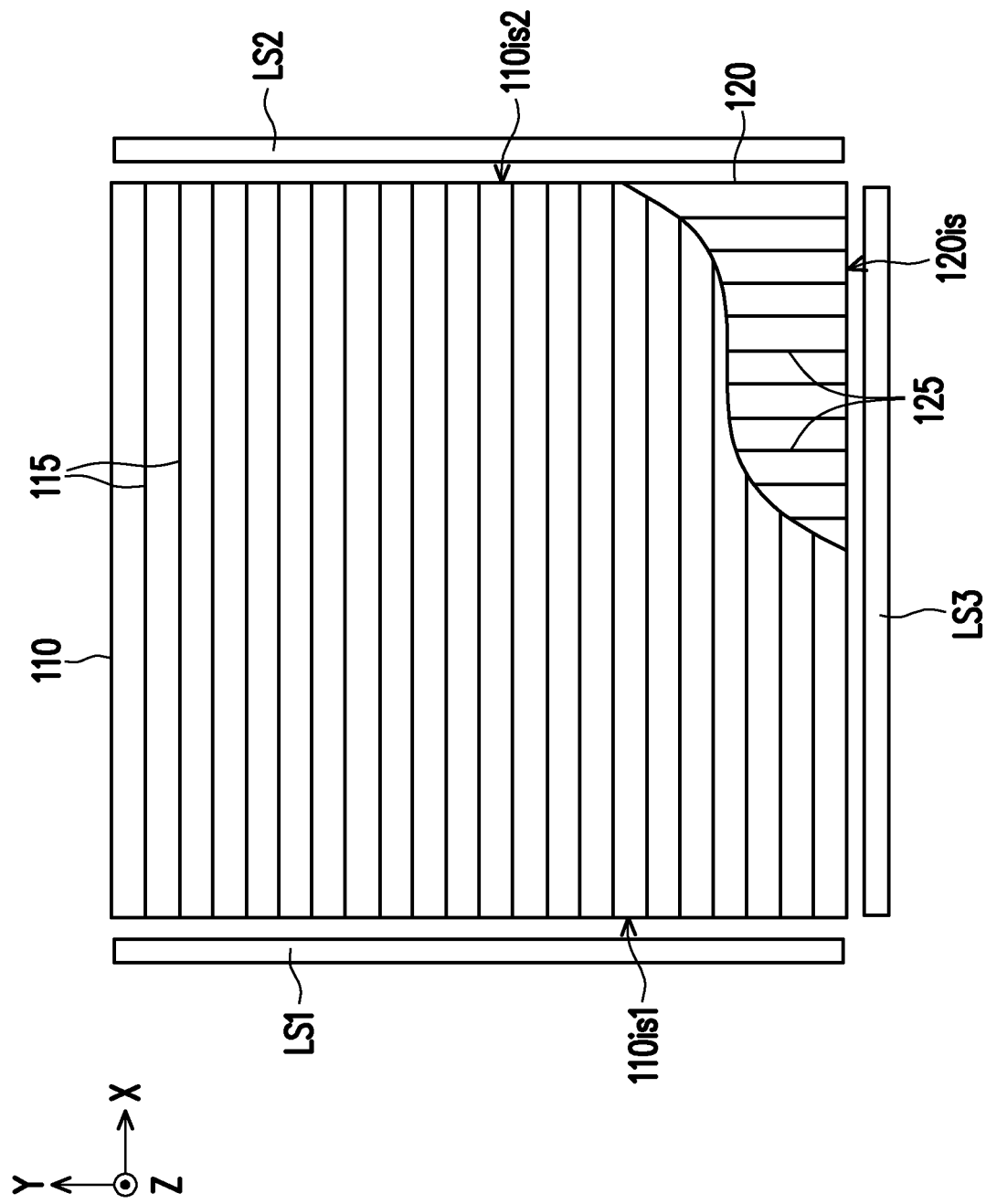
FIG. 2 is a schematic top view of some components of the display apparatus of FIG. 1A.
Figure 3:
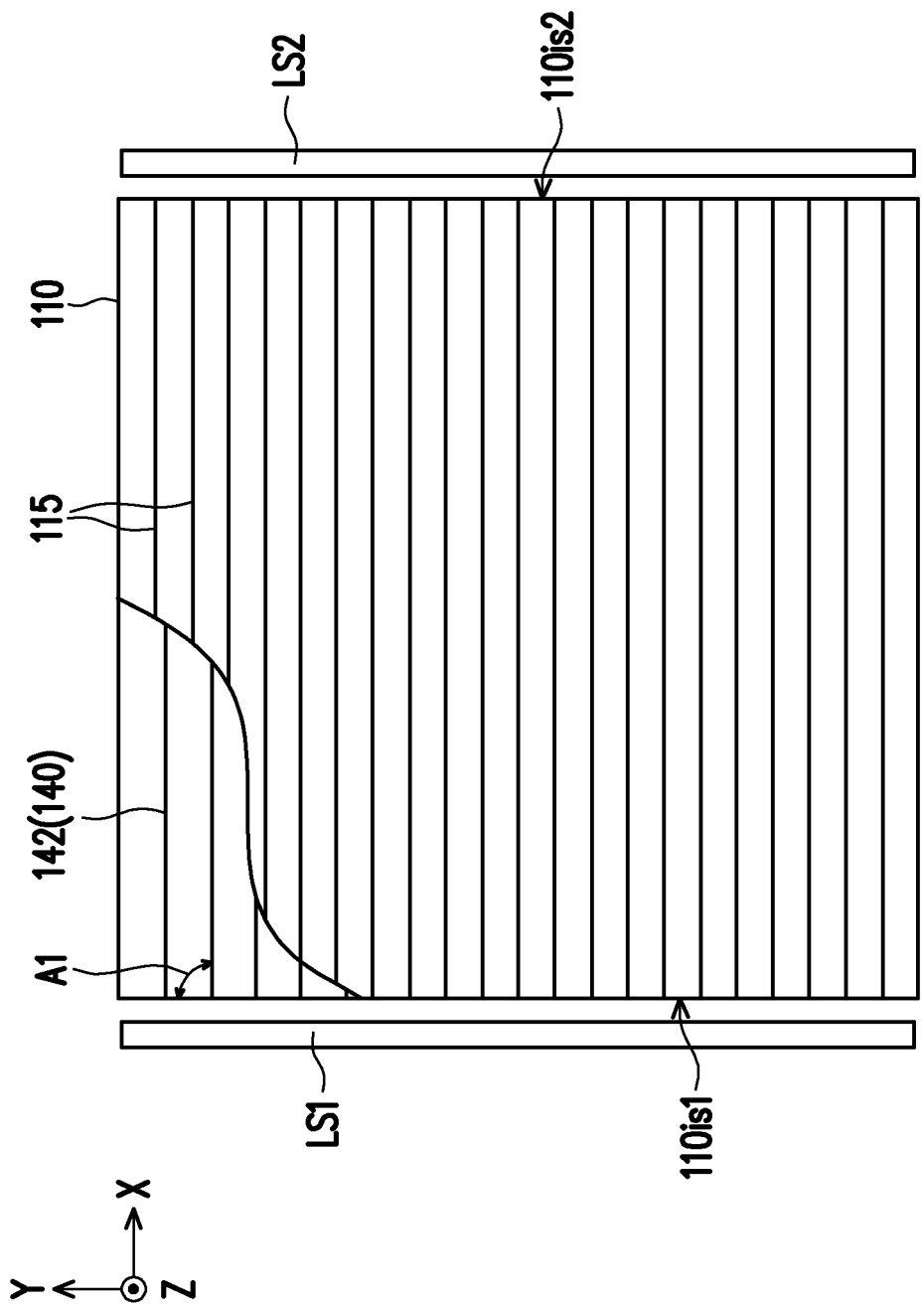
FIG. 3 is a schematic top view of some components of the display apparatus of FIG. 1A.
Figure 4:
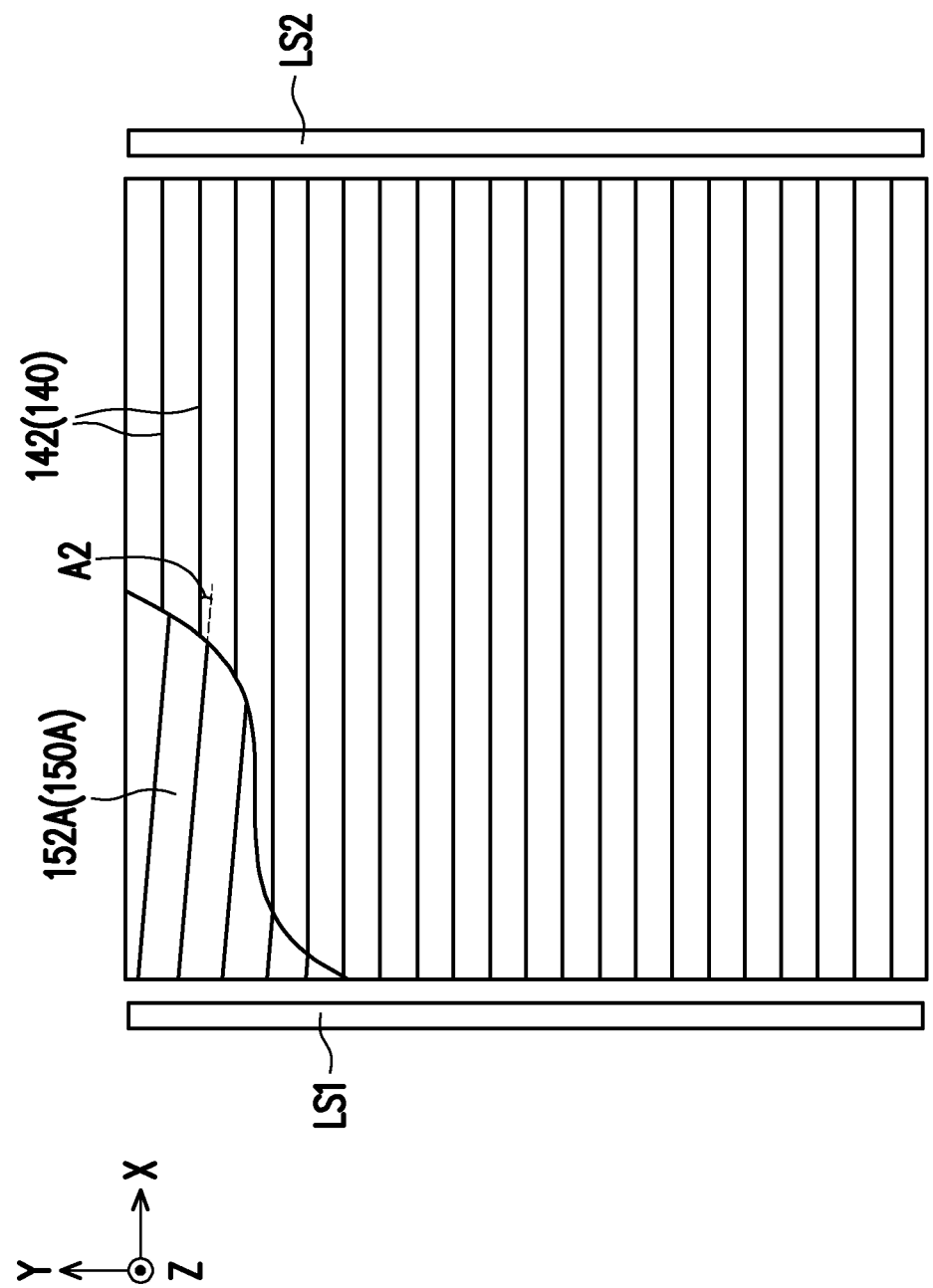
FIG. 4 is a schematic top view of another modified embodiment of some components of the display apparatus of FIG. 1A.
Figure 5:
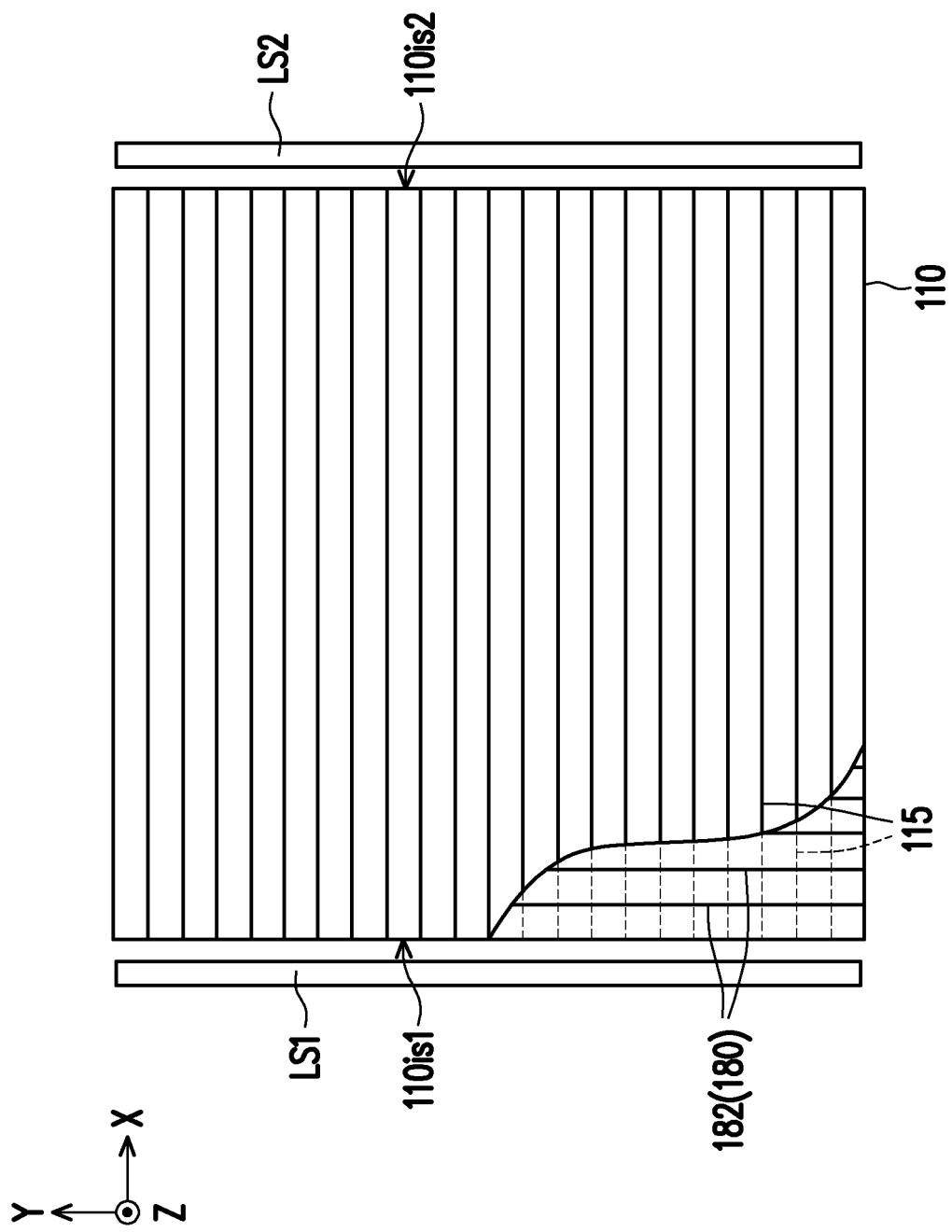
FIG. 5 is a schematic top view of some components of the display apparatus of FIG. 1A.
Figure 7:
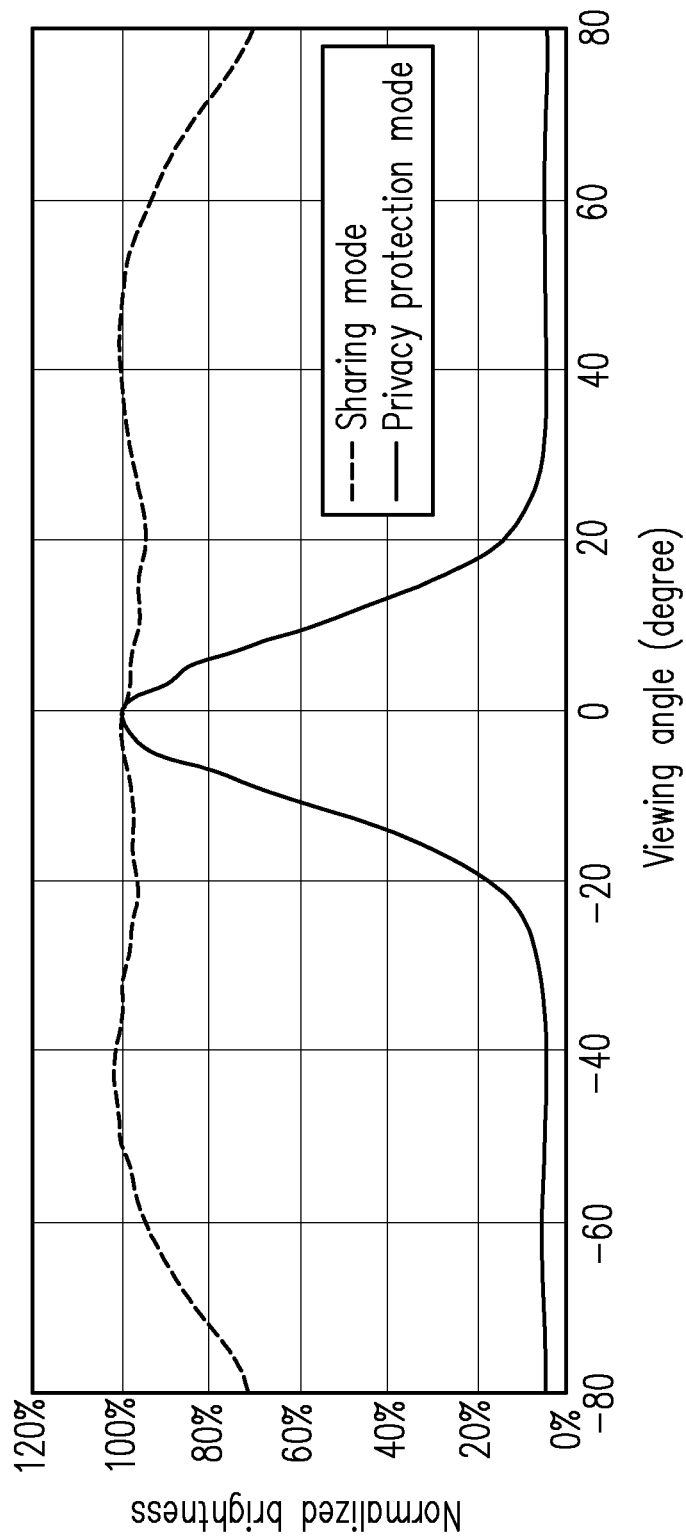
FIG. 7 is a distribution curve diagram of the normalized brightness versus the viewing angle of the display apparatus operating in the sharing mode and the privacy protection mode according to the first embodiment of the disclosure.

FIGS. 1A and 1B are schematic side views of the display apparatus according to a first embodiment of the disclosure in different directions, respectively. FIGS. 2, 3, and 5 are schematic top views of some components of the display apparatus of FIG. 1A, respectively. FIG. 4 is a schematic top view of another modified embodiment of some components of the display apparatus of FIG. 1A. FIG. 6A is a schematic diagram illustrating the distribution of the brightness of light emitted by different light sources versus the viewing angle of the display apparatus operating in the sharing mode according to the first embodiment of the disclosure. FIG. 6B is a schematic diagram illustrating the distribution of the total brightness versus the viewing angle of the display apparatus operating in the sharing mode according to the first embodiment of the disclosure. FIG. 7 is a distribution curve diagram of the normalized brightness versus the viewing angle of the display apparatus operating in the sharing mode and the privacy protection mode according to the first embodiment of the disclosure.

Please refer to FIGS. 1A and 1B. A display apparatus 10 includes a backlight module 100 and a display panel 200 which are disposed in an overlapping manner. The backlight module 100 includes a first light guide plate 110 and a second light guide plate 120 which are disposed in an overlapping manner. The first light guide plate 110 is located between the display panel 200 and the second light guide plate 120. The first light guide plate 110 has a first light incident surface 110*is*1, a first light emitting surface 110*es*, and a first bottom surface 110*bs*. The first light emitting surface 110*es* and the first bottom surface 110*bs* are connected to the first light incident surface 110*is*1 and opposite to each other. The display panel 200 is disposed on one side of the first light emitting surface 110*es* of the first light guide plate 110 and overlaps the first light emitting surface 110*es*. The second light guide plate 120 is disposed on one side of the first bottom surface 110*bs* of the first light guide plate 110. The display panel 200 is, for example, a liquid crystal display panel, or other non-self-luminous display panels.

Moreover, the second light guide plate 120 has a second light incident surface 120*is*, a second light emitting surface 120*es*, and a second bottom surface 120*bs*. The second light emitting surface 120*es* and the second bottom surface 120*bs* are connected to the second light incident surface 120*is* and opposite to each other. The second light emitting surface 120*es* of the second light guide plate 120 faces the first bottom surface 110*bs* of the first light guide plate 110. The display panel 200 overlaps the second light emitting surface 120*es*. It should be noted that in the embodiment, the first light guide plate 110 may further have a third light incident surface 110*is*2 connected to the first light emitting surface 110*es* and the first bottom surface 110*bs* and disposed opposite to the first light incident surface 110*is*1, but is not limited thereto.

A first light source LS1 is disposed on one side of the first light incident surface 110*is*1 of the first light guide plate 110. A second light source LS3 is disposed on one side of the second light incident surface 120*is* of the second light guide plate 120. A third light source LS2 is disposed on one side of the third light incident surface 110*is*2 of the first light guide plate 110. For example, the first light incident surface 110*is*1 and the third light incident surface 110*is*2 of the first light guide plate 110 may be respectively perpendicular to the second light incident surface 120*is* of the second light guide plate 120 (as shown in FIG. 2), but are not limited thereto. The first light source LS1, the third light source LS2, and the second light source LS3 are, for example, light bars composed of multiple light emitting elements (e.g., light emitting diodes) and circuit boards or cold cathode tubes, but are not limited thereto. In order to increase the light energy utilization rate, a reflective sheet 160 may further be disposed on one side of the second bottom surface 120*bs* of the second light guide plate 120. The reflective sheet 160 is, for example, a silver reflective sheet, a white reflective sheet, or other suitable reflective sheets.

Further, the backlight module 100 further includes a viewing angle control film 130, a first prism sheet 140, and a diffusor 170. The viewing angle control film 130 is disposed between the first light guide plate 110 and the second light guide plate 120. The first prism sheet 140 is disposed between the first light guide plate 110 and the viewing angle control film 130. The diffusor 170 is disposed on one side of the first light emitting surface 110*es* of the first light guide plate 110, and is located between the first light guide plate 110 and the display panel 200. The viewing angle control film 130 is, for example, a 3M's Louver film, Toray's PICASUS VT, or a polarized viewing angle control element. In the embodiment, the viewing angle control film 130 may define a viewing angle control direction VD of the display apparatus 10, and the viewing angle control direction VD is, for example, parallel to a direction X in FIG. 1A. For example, the viewing angle control film 130 may be disposed with multiple light-shielding walls 135, and the light-shielding walls 135 are arranged at intervals along the direction X and extend in a direction Y. The light-shielding walls 135 are configured to at least partially reflect or absorb light, and light may pass between two adjacent of the light-shielding walls 135.

The first prism sheet 140 has a first substrate 141 and multiple first prism structures 142. The first prism structures 142 are arranged along the direction Y on one side surface of the first substrate 141 facing the first light guide plate 110, and extend in the direction X. In the embodiment, an included angle A1 between the extending direction of the orthographic projection of the first prism structure 142 on the first bottom surface 110*bs* of the first light guide plate 110 and the first light incident surface 110*is*1 (or the third light incident surface 110*is*2) of the first light guide plate 110 may be 90 degrees (as shown in FIG. 3). However, the disclosure is not limited thereto. In other unillustrated embodiments, the included angle A1 may also be any angle other than 90 degrees within a range of greater than or equal to 60 degrees and less than or equal to 120 degrees.

In the embodiment, the first light source LS1 and the third light source LS2 are adapted to emit light toward the first light guide plate 110, respectively. Part of the light LB1 and LB2 is emitted from the first light emitting surface 110*es* after transmitted through the lateral direction of the first light guide plate 110, and is transmitted to the display panel 200. Since another part of the light (e.g., light LB1") is emitted from the first bottom surface 110*bs* of the first light guide plate 110 and transmitted to the viewing angle control film 130 during the lateral transmission process in the first light guide plate 110, the another part of the light is reflected or absorbed by the light-shielding walls 135 of the viewing angle control film 130, resulting in loss of light energy or formation of stray light. Through the disposition of the above-mentioned first prism sheet 140, such unexpectedly emitted light (e.g., the light LB1") can be reflected back to the first light guide plate 110, thereby increasing the light energy utilization rate of the light source.

In addition, after the light LB3 emitted by the second light source LS3 is transmitted in the lateral direction of the second light guide plate 120 and emitted through the second light guide plate 120, the light path thereof is deflected toward the front view direction (e.g., a direction Z) after passing through the first prism sheet 140. In other words, the disposition of the first prism sheet 140 may further be configured to increase the light collection of the light LB3 after emitted from the second light guide plate 120, so as to improve the forward luminance of the display apparatus 10.

The backlight module 100 may further optionally include a second prism sheet 150, which is disposed between the viewing angle control film 130 and the second light guide plate 120. Similar to the first prism sheet 140, the second prism sheet 150 has a second substrate 151 and multiple second prism structures 152. The second prism structures 152 are arranged along the direction Y on one side surface of the second substrate 151 facing the first light guide plate 110, and extend in the direction X. That is, the extending direction of the orthographic projection of the second prism structure 152 on the first substrate 141 is substantially parallel to the extending direction of the orthographic projection of the first prism structure 142 on the first substrate 141. In simple terms, the extending direction of the second prism structure 152 of the second prism sheet 150 is substantially parallel to the extending direction of the first prism structure 142 of the first prism sheet 140. However, the disclosure is not limited thereto. In another embodiment, an included angle A2 between the extending direction of a second prism structure 152A of a second prism sheet 150A and the extending direction of the first prism structure 142 of the first prism sheet 140 may also be greater than 0 degrees and less than or equal to 30 degrees (as shown in FIG. 4).

Part of the light LB3 refracted twice through the first prism structure 142 and the second prism structure 152 may be transmitted to the first light guide plate 110 in a light path closer to the front view direction. Not only can the proportion of the light LB3 absorbed by the viewing angle control film 130 be reduced (i.e., an increase in the light energy utilization rate of the second light source LS3) after the light LB3 is emitted through the second light guide plate 120, but the concentration of light emitted through the second light guide plate 120 can further be improved.

In the embodiment, the display apparatus 10 is adapted to operate in a sharing mode with a larger viewing angle range or a privacy protection mode with a smaller viewing angle range. It should be particularly noted that when the display apparatus 10 operates in the privacy protection mode, only the second light source LS3 provides the illumination light required for the privacy protection display. When the display apparatus 10 operates in the sharing mode, the first light source LS1, the third light source LS2, and the second light source LS3 provide the illumination light required for the wide viewing angle display.

In order to deflect the light path emitted by the first light source LS1 or the third light source LS2 toward the front view direction, multiple first optical microstructures MS1 may further be disposed on the first bottom surface 110bs of the first light guide plate 110. In the embodiment, the first optical microstructure MS1 has a first surface RS1 facing the first light source LS1 and a third surface RS2 facing the third light source LS2. The first surface RS1 is adapted to reflect the light LB1 from the first light source LS1 and transmitted in the first light guide plate 110, so that the light LB1 can be emitted from the first light guide plate 110 in a more positive light path. The third surface RS2 is adapted to reflect the light LB2 from the third light source LS2 and transmitted in the first light guide plate 110, so that the light LB2 can be emitted from the first light guide plate 110 in a more positive light path (as shown in FIG. 1A).

Similarly, in order to deflect the light path emitted by the second light source LS3 toward the front view direction, multiple second optical microstructures MS2 may further be disposed on the second bottom surface 120bs of the second light guide plate 120. In the embodiment, the second optical microstructure MS2 has a second surface RS3 facing the second light source LS3. Moreover, the second surface RS3 is adapted to reflect the light LB3 from the second light source LS3 and transmitted in the second light guide plate 120, so that the light LB3 can be emitted from the second light guide plate 120 in a more positive light path (as shown in FIG. 1B).

A first included angle θ1 between the first surface RS1 of the first optical microstructure MS1 and the first bottom surface 110bs and a third included angle θ2 between the third surface RS2 and the third bottom surface 110bs may optionally be the same. The first included angle θ1 and the third included angle θ2 are both greater than or equal to 3 degrees and less than or equal to 60 degrees. Moreover, a second included angle θ3 between the second surface RS3 of the second optical microstructure MS2 and the second bottom surface 120bs is greater than or equal to 3 degrees and less than or equal to 18 degrees.

For example, in the embodiment, the first included angle θ1 and the third included angle θ2 may be greater than or equal to 3 degrees and less than or equal to 30 degrees. Accordingly, the light LB1 from the first light source LS1 forms a light energy distribution of the viewing angle range biased to the right side (as shown by the curve C1a in FIG. 6A) after reflected by the first surface RS1 of the first optical microstructure MS1. The light LB2 from the third light source LS2 forms a light energy distribution of the viewing angle range biased to the left side (as shown by the curve C2a in FIG. 6A) after reflected by the third surface RS2 of the first optical microstructure MS1. The light LB3 from the second light source LS3 forms a light energy distribution of the front viewing angle range (as shown by the curve C3a in FIG. 6A) after reflected by the second surface RS3 of the second optical microstructure MS2.

Furthermore, in order to improve the light collection of the first light guide plate 110 along the direction Y, multiple first columnar structures 115 may further be disposed on the light emitting surface 110es of the first light guide plate 110. The first columnar structures 115 are arranged along the direction Y and extend in the direction X. More specifically, the extending direction of the first columnar structure 115 may be perpendicular to the first light incident surface 110is1 and the third light incident surface 110is2 of the first light guide plate 110 (as shown in FIG. 2). The first columnar structure 115 has a height h1 along the normal direction (e.g., the direction Z) of the first light emitting surface 110es, and has a width w1 along a direction (e.g., the direction Y) perpendicular to the extending direction of the first columnar structure 115 and parallel to the first light emitting surface 110es. Exemplarily, the ratio of the height h1 to the width w1 of the first columnar structure 115 is greater than or equal to 0.1.

Similarly, in order to improve the light collection of the second light guide plate 120 along the direction X, multiple second columnar structures 125 may further be disposed on the second light emitting surface 120es of the second light guide plate 120. The second columnar structures 125 are arranged along the direction X and extend in the direction Y. More specifically, the extending direction of the second columnar structure 125 may be perpendicular to the second light incident surface 120is of the second light guide plate 120 (as shown in FIG. 2). The second columnar structure 125 has a height h2 along the normal direction (e.g., the direction Z) of the second light emitting surface 120es, and has a width w2 along a direction (e.g., the direction X) perpendicular to the extending direction of the second columnar structure 125 and parallel to the second light emitting surface 120es. Exemplarily, the ratio of the height h2 to the width w2 of the second columnar structure 125 is greater than or equal to 0.1.

Further, the backlight module 100 may be disposed on one side of the first light emitting surface 110es of the first light guide plate 110, and may further optionally be disposed with a third prism sheet 180 and an electronically controlled diffusion film 190. The third prism sheet 180 is located between the electronically controlled diffusion film 190 and the first light guide plate 110, and the diffusor 170 is located between the first light guide plate 110 and the electronically controlled diffusion film 190. The third prism sheet 180 has a third substrate 181 and multiple third prism structures 182. The third prism structures 182 are arranged along the direction X on one side surface of the third substrate 181 away from the first light guide plate 110 and extend in the direction Y. Exemplarily, an included angle between the extending direction of the orthographic projection of the third prism structure 182 on the first light emitting surface 110es of the first light guide plate 110 and the first incident surface 110is1 (or the third incident surface 110is2) of the first light guide plate 110 is greater than 0 degrees and less than or equal to 30 degrees. For example, in the embodiment, the extending direction of the orthographic projection of the third prism structure 182 on the first light emitting surface 110es of the first light guide plate 110 may optionally be parallel to the first incident surface 110is1 and the third incident surface 110is2 of the first light guide plate 110 (as shown in FIG. 5).

In the embodiment, the electronically controlled diffusion film 190 is adapted to switch operation between the scattering state and the transparent state. For example, when the display apparatus 10 operates in the sharing mode, the scattering state of the electronically controlled diffusion film 190 may be used to expand the viewing angle distribution ranges of the light LB1, the light LB2, and the light LB3, so that the overall light type distribution of the light from different light sources may be more uniform (as shown in FIG. 6B) after the light from different light sources are emitted from the first light guide plate 110. Conversely, when the display apparatus 10 operates in the privacy protection mode, the transparent state of the electronically controlled diffusion film 190 is used, so that the light LB3 from the second light source LS3 maintains the existing light type distribution after passing through the electronically controlled diffusion film 190.

The electronically controlled diffusion film 190 is, for example, a polymer dispersed liquid crystal (PDLC) film, a polymer network liquid crystal (PNLC) film, or a liquid crystal lens (LC Lens).

As shown in FIG. 7, when the display apparatus 10 of the embodiment operates in the sharing mode, the three light sources are used to emit light at the same time, and the configuration relationship of each of the above-mentioned film layer structures is used, so that the light energy distribution of these light sources disperse within different viewing angle ranges. Moreover, the overall light emitting brightness distribution is more uniform and the viewing angle range is wider through the scattering state of the electronically controlled diffusion film 190. When the display apparatus 10 operates in the privacy protection mode, only the second light source LS3 emits light, and the configuration relationship of each of the above-mentioned film layer structures is used, so that the light types of the emitted light concentrated within the front viewing angle range.

Figure 8A:
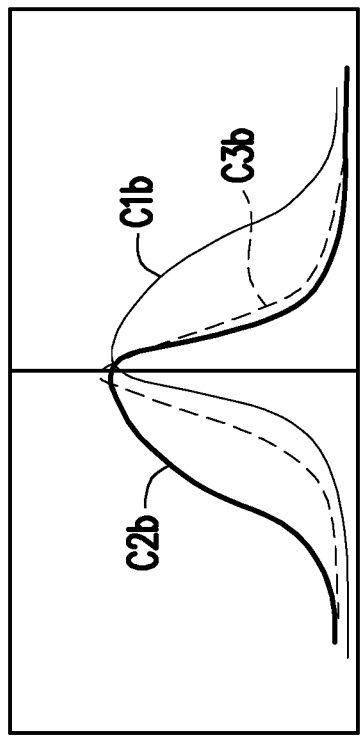
FIG. 8A is a schematic diagram illustrating the distribution of the brightness of light emitted by different light sources versus the viewing angle of the display apparatus operating in the sharing mode according to the another modified embodiment of FIG. 1A.
Figure 8B:
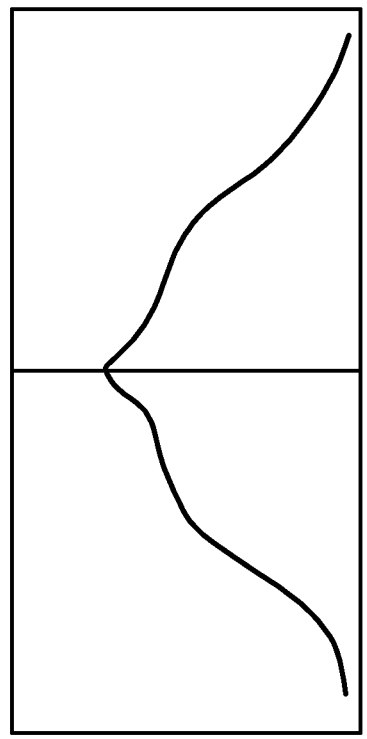
FIG. 8B is a schematic diagram illustrating the distribution of the total brightness versus the viewing angle of the display apparatus operating in the sharing mode according to the another modified embodiment of FIG. 1A.

FIG. 8A is a schematic diagram illustrating the distribution of the brightness of light emitted by different light sources versus the viewing angle of the display apparatus operating in a sharing mode according to the another modified embodiment of FIG. 1A. FIG. 8B is a schematic diagram illustrating the distribution of the total brightness versus the viewing angle of the display apparatus operating in the sharing mode according to the another modified embodiment of FIG. 1A. Different from the light energy distribution in FIG. 6A, when the first included angle θ1 between the first surface RS1 of the first optical microstructure MS1 of the first light guide plate 110 and the first bottom surface 110bs and the third angle θ2 between the third surface RS2 and the first bottom surface 110bs is greater than 30 degrees and less than or equal to 60 degrees, the light energy distribution of the light LB1 from the first light source LS1 is still biased to the right-side viewing angle, the light energy distribution of the light LB1 from the first light source LS1 is closer to the front viewing angle (as shown by the curve C1b in FIG. 8A) after the light LB1 from the first light source LS1 is emitted through the first light guide plate 110. Similarly, although the light energy distribution of the light LB2 from the third light source LS2 is still biased to the left-side viewing angle, the light energy distribution of the light LB2 from the third light source LS2 is closer to the front viewing angle (as shown by the curve C2b in FIG. 8A) after the light LB2 from the third light source LS2 is emitted through the first light guide plate 110. That is, in the modified embodiment, the light emitting distributions of the first light source LS1 and the third light source LS2 on the first light emitting surface 110es of the first light guide plate 110 are closer to the light emitting distribution of the second light source LS3 on the first light emitting surface 110es of the first light guide plate 110 (as shown by the curve C3b in FIG. 8A) when compared with FIG. 6A.

FIG. 8B shows the superimposed light types formed by the light of the above-mentioned light sources after scattered by the electronically controlled diffusion film 190. Compared with FIG. 6B, in the modified embodiment, the display apparatus may have higher brightness output in the front viewing angle range.

Since the degree of dispersion of the light emitting distributions of the three light sources of the display apparatus 10 (as shown in FIGS. 6A and 8A) may be changed by adjusting the optical microstructures of the light guide plate, the selection of the diffusor 170 may be more flexible. For example, the haze value of the diffusor 170 is in the range of greater than or equal to 10% and less than or equal to 95%. Exemplarily, the haze value of the diffusor 170 is in the range of greater than or equal to 25% and less than or equal to 75%.

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 9A:
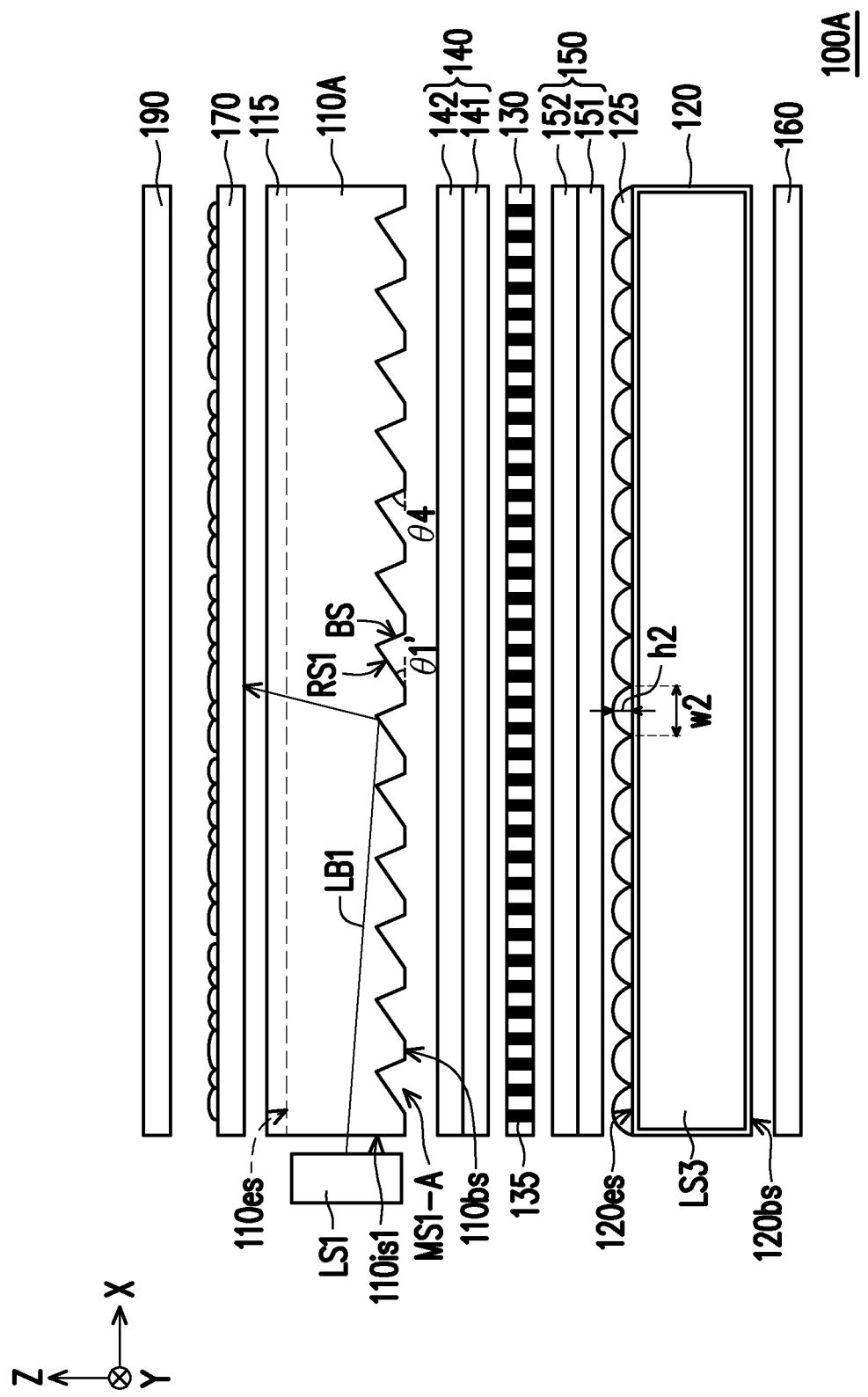
FIGS. 9A and 9B are schematic side views of the backlight module according to a second embodiment of the disclosure in different directions, respectively.
Figure 9B:
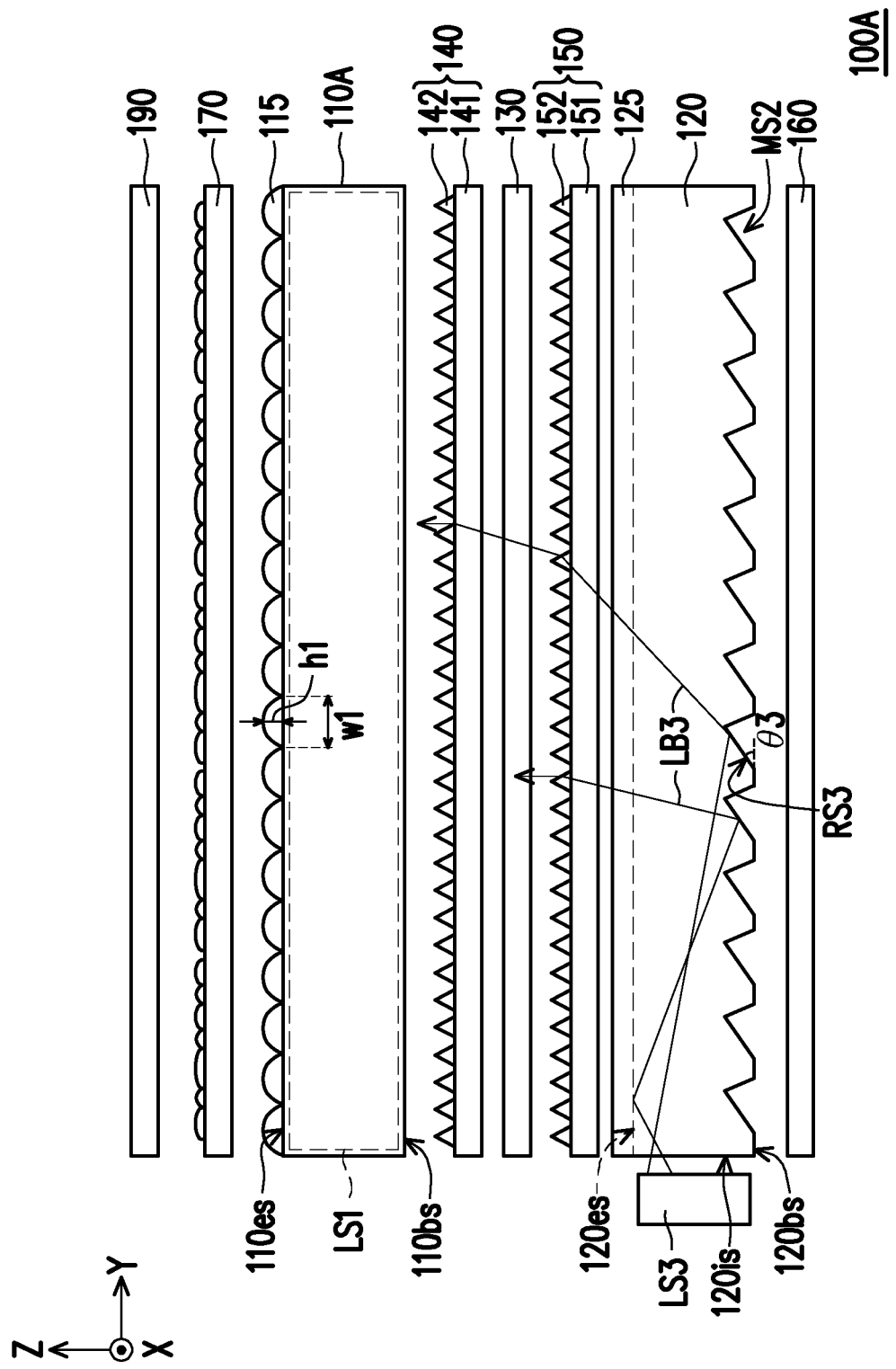

FIGS. 9A and 9B are schematic side views of the backlight module according to a second embodiment of the disclosure in different directions, respectively. Referring to FIGS. 9A and 9B, the difference between a backlight module 100A of the embodiment and the backlight module 100 of FIGS. 1A and 1B lies in that the backlight module 100A is not disposed with the third prism sheet 180 and the third light source LS2 of FIG. 1A.

Different from the first optical microstructure MS1 of the first light guide plate 110 in FIG. 1 having the first surface RS1 and the third surface RS2 disposed symmetrically, a first optical microstructure MS1-A of a first light guide plate 110A of the embodiment has a first surface RS1 facing the first light source LS1 and a backlight surface BS farther away from the light source LS1, and the first surface RS1 and the backlight surface BS are disposed asymmetrically. Specifically, a first angle θ1' between the first surface RS1 of the first optical microstructure MS1-A and the first bottom surface 110bs is different from a fourth angle θ4 between the backlight surface BS and the first bottom surface 110bs. In this way, the backlight module 100A may meet the lighting requirements of the asymmetric light type.

Figure 10A:
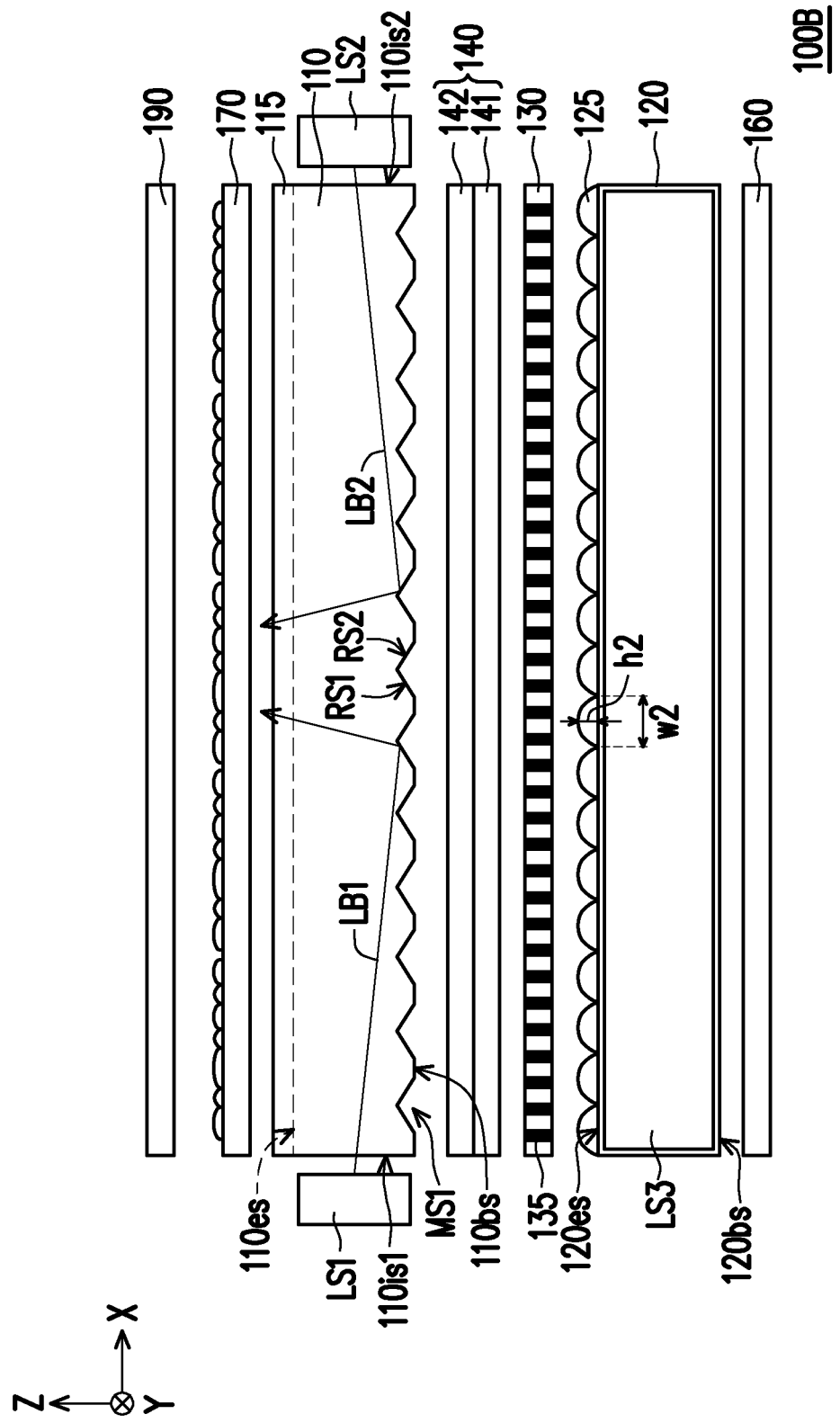
FIGS. 10A and 10B are schematic side views of the backlight module according to a third embodiment of the disclosure in different directions, respectively.
Figure 10B:
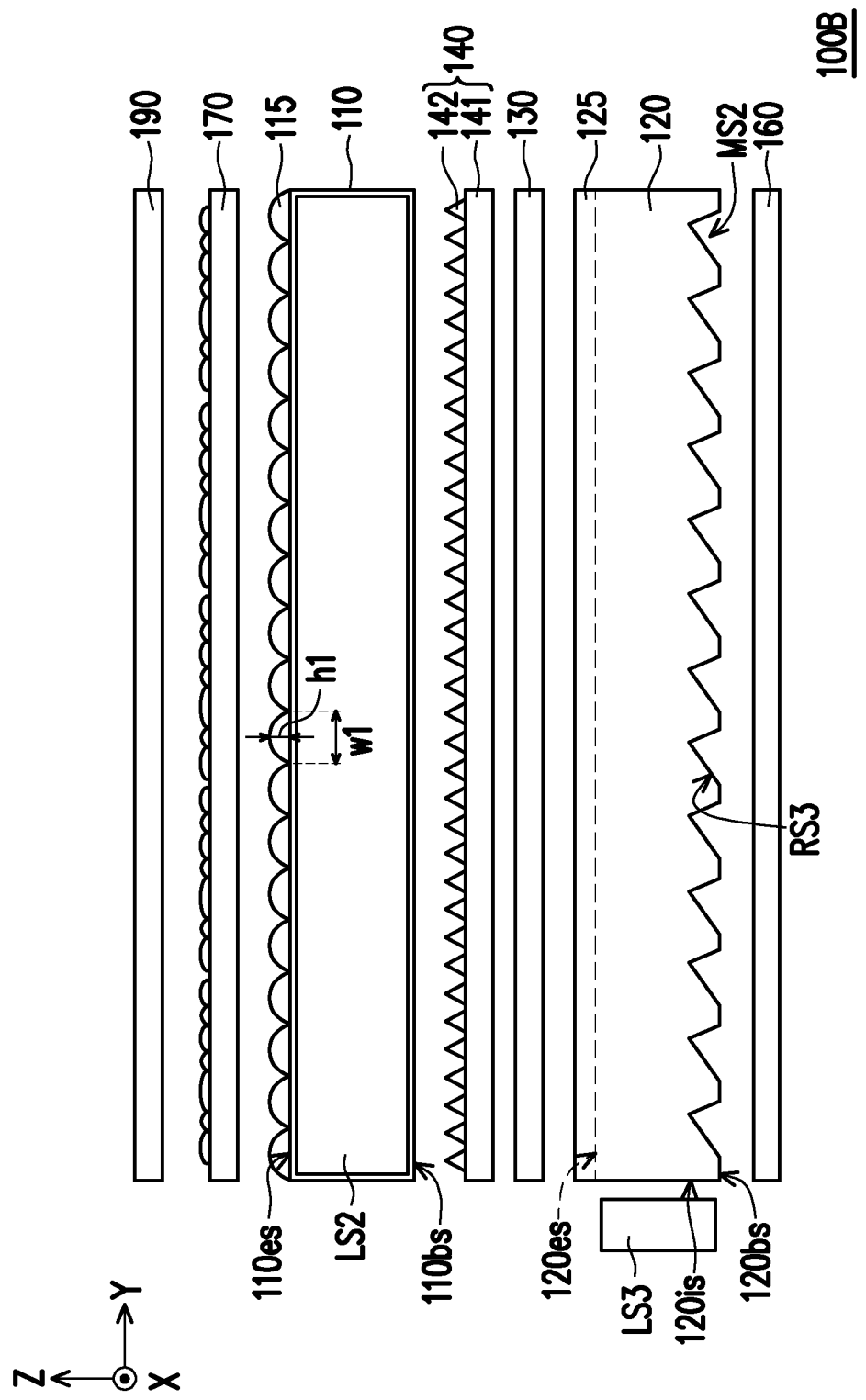

FIGS. 10A and 10B are schematic side views of the backlight module according to a third embodiment of the disclosure in different directions, respectively. Referring to FIGS. 10A and 10B, the difference between a backlight module 100B of the embodiment and the backlight module 100 of FIGS. 1A and 1B lies in that the backlight module 100B may not be disposed with the second prism sheet 150 and the third prism sheet 180 of FIG. 1A.

Since the functions of the components of the backlight module 100B are similar to the functions of the components of the backlight module 100 of FIG. 1A, please refer to the relevant paragraphs of the foregoing embodiments for detailed description.

Figure 11A:
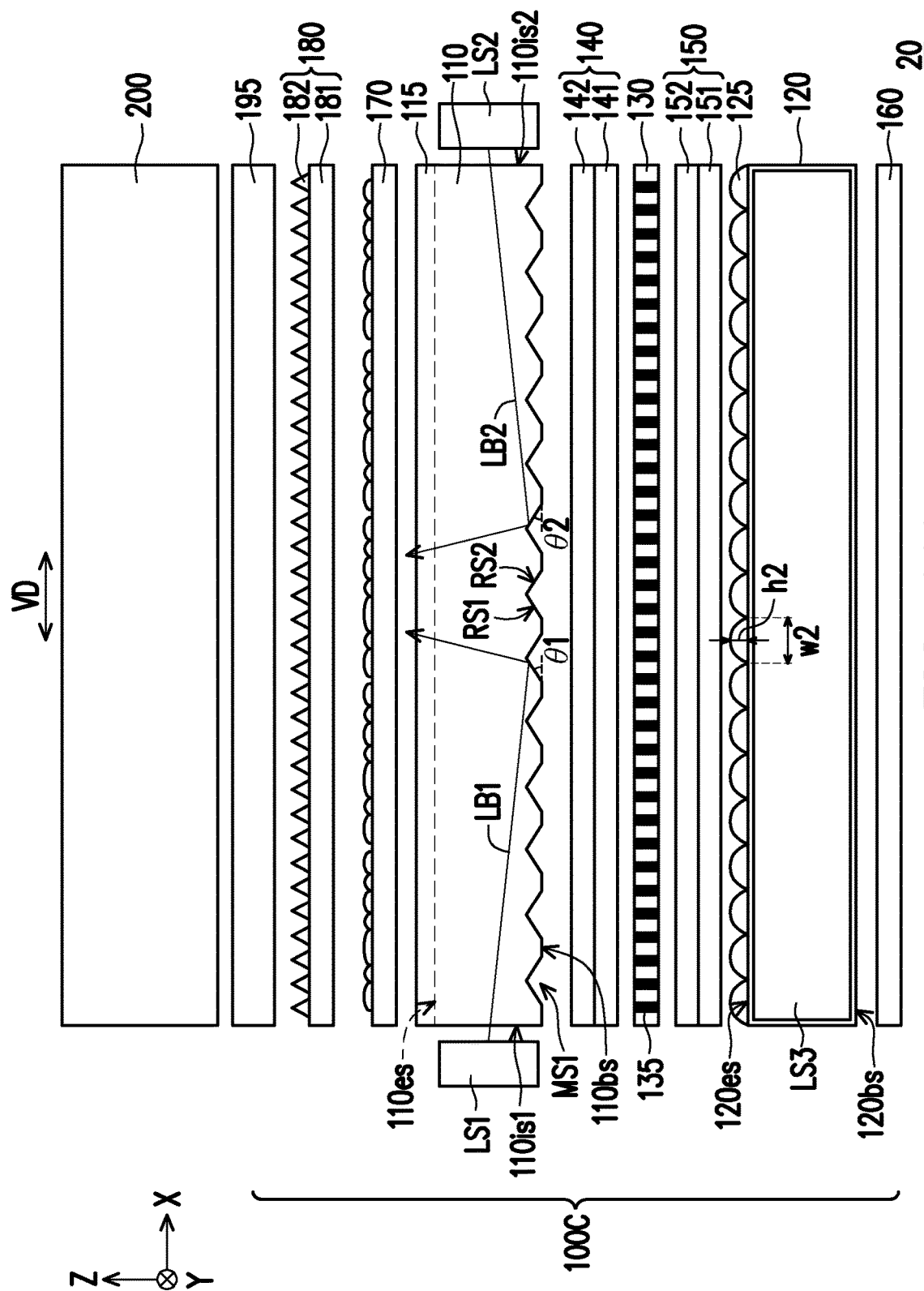
FIGS. 11A and 11B are schematic side views of the display apparatus according to the fourth embodiment of the disclosure in different directions, respectively.
Figure 11B:
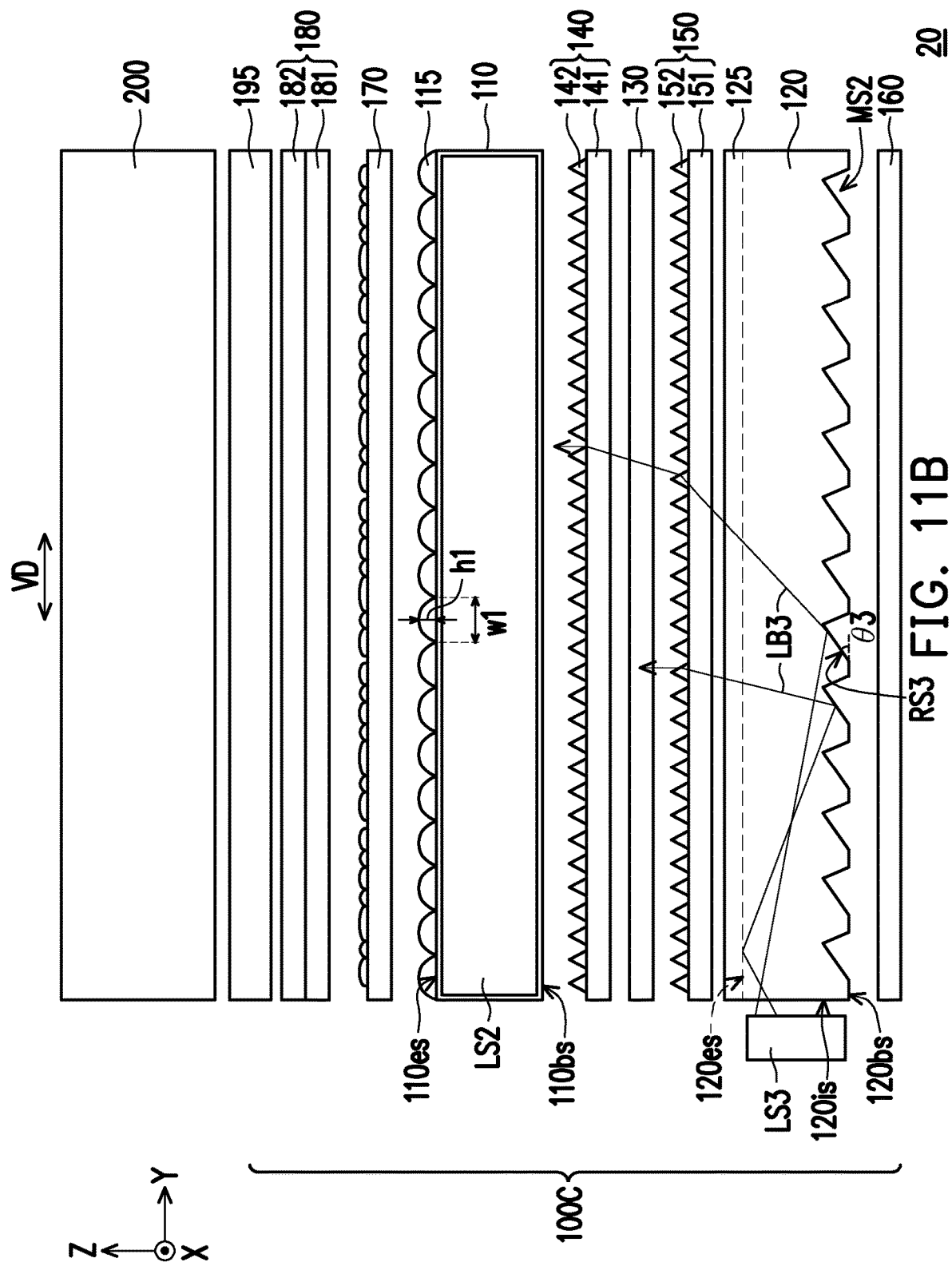
Figure 12:
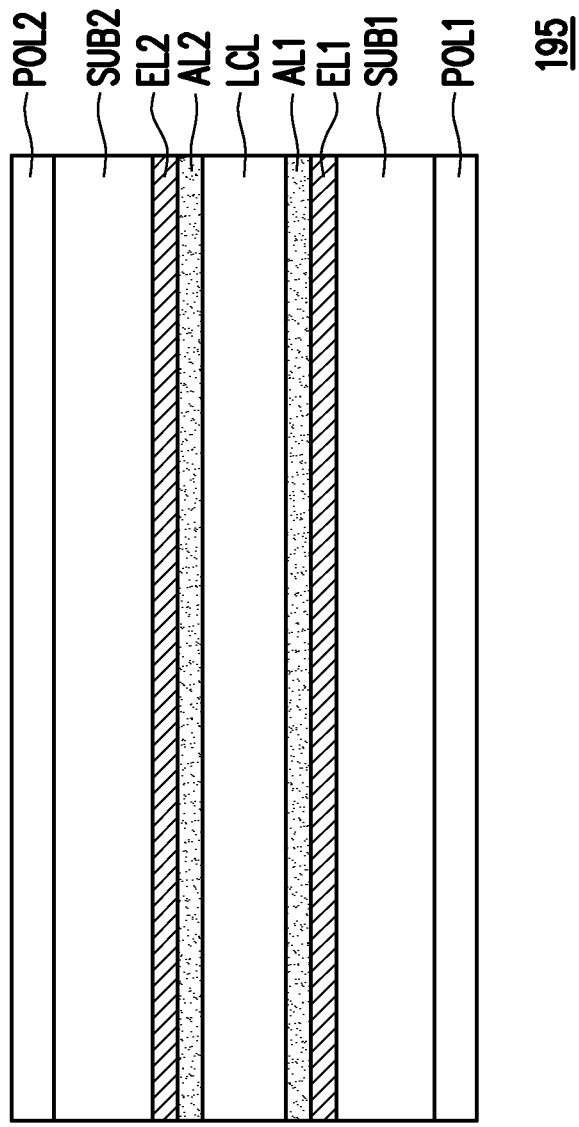
FIG. 12 is a schematic cross-sectional view of the electronically controlled viewing angle switch of FIG. 11A.
Figure 13:
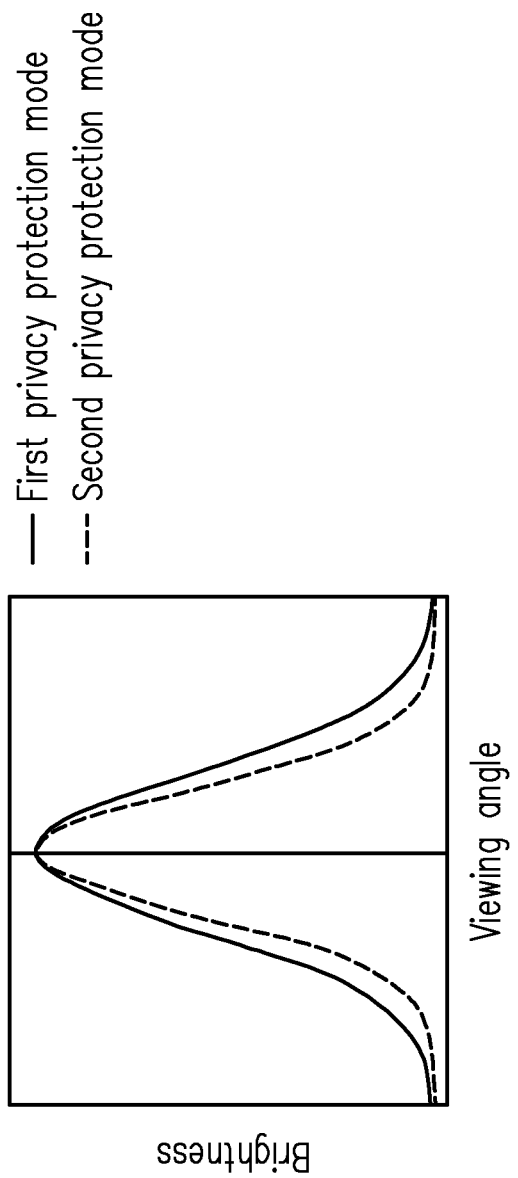
FIG. 13 is a schematic diagram illustrating the distribution of the brightness versus the viewing angle of the display apparatus of FIG. 11A operating in different privacy protection modes.

FIGS. 11A and 11B are schematic side views of the display apparatus according to the fourth embodiment of the disclosure in different directions, respectively. FIG. 12 is a schematic cross-sectional view of the electronically controlled viewing angle switch of FIG. 11A. FIG. 13 is a schematic diagram illustrating the distribution of the brightness versus the viewing angle of the display apparatus of FIG. 11A operating in different privacy protection modes. Referring to FIGS. 11A to 12, the difference between a display apparatus 20 of the embodiment and the display apparatus 10 of FIG. 1A lies in that a backlight module 100C of the embodiment replaces the electronically controlled diffusion film 190 of the backlight module 100 in FIG. 1A with an electronically controlled viewing angle switch 195.

In the embodiment, the electronically controlled viewing angle switch 195 may include a liquid crystal layer LCL, an electrode layer EL1, an electrode layer EL2, a substrate SUB1, a substrate SUB2, an alignment film AL1, an alignment film AL2, a polarizer POL1, and a polarizer POL2. The liquid crystal layer LCL is disposed between the substrate SUB1 and the substrate SUB2. The electrode layer EL1 is disposed between the liquid crystal layer LCL and the substrate SUB1. The electrode layer EL2 is disposed between the liquid crystal layer LCL and the substrate SUB2. The alignment film AL1 is disposed between the liquid crystal layer LCL and the electrode layer EL1. The alignment film AL2 is disposed between the liquid crystal layer LCL and the electrode layer EL2. The polarizer POL1 and the polarizer POL2 are respectively disposed on opposite sides of the substrate SUB1 and the substrate SUB2 away from the liquid crystal layer LCL.

It should be noted that the viewing angle control direction VD of the display apparatus 20 may be defined by the axial direction of the absorption axis of the polarizer POL2 that is closer to the display panel 200. That is, in the embodiment, the axial direction of the absorption axis of the polarizer POL2 is parallel to the direction X.

Moreover, the alignment film is configured to align multiple liquid crystal molecules (not shown) of the liquid crystal layer LCL, so that the optical axes thereof are oriented in a predetermined direction. In the embodiment, the alignment directions of the two alignment films AL1 and AL2 may intersect with each other, for example, the angle between the two alignment directions may be in the range of 90 degrees to 270 degrees, and the liquid crystal layer LCL may include twisted nematic liquid crystal (TN-LC). That is, the electronically controlled viewing angle switch 195 of the embodiment may include a TN-LC cell or a super twisted nematic liquid crystal cell (STN-LC cell). However, the disclosure is not limited thereto. According to other embodiments, the operation mode of the liquid crystal cell of the electronically controlled viewing angle switch may also be an electrically controlled birefringence (ECB) mode, an optically compensated bend (OCB) mode, an in-plane switching (IPS) mode, or a vertical alignment/multi domain vertical alignment (VA/MVA) mode.

Further, when the electrode layer EL1 and the electrode layer EL2 are enabled to have a potential difference between the two electrode layers, the potential difference may form an electric field between the two electrode layers to drive the liquid crystal molecules of the liquid crystal layer LCL to rotate to change the overall phase retardation, thereby changing the polarization state of the light passing through the liquid crystal layer LCL. In the embodiment, the electrode layer EL1 and the electrode layer EL2 are, for example, light-transmitting electrodes, and the materials of the light-transmitting electrodes include indium tin oxide, indium zinc oxide, aluminum tin oxide, aluminum zinc oxide, or other suitable oxides, very thin metals, metal meshes or wire grids, carbon nanotubes, Ag nano-wires, graphene, or a stacked layer of at least two of the above. It should be noted that in the disclosure, the electrode layers of the electronically controlled viewing angle switch may be at least two electrode layers disposed on opposite sides of the liquid crystal layer according to different operation modes of the liquid crystal cell, or at least one electrode layer disposed on one side of the liquid crystal layer.

In the embodiment, the display apparatus 20 may be further provided with different degrees of privacy protection effects through the disposition of the electronically controlled viewing angle switch 195. Please also refer to FIG. 13. For example, when the display apparatus 20 performs a privacy protection display (i.e., the second light source LS3 is enabled to emit light), if the electronically controlled viewing angle switch 195 does not function, the display apparatus 20 operates in a first privacy protection mode, and has a first viewing angle range; if the electronically controlled viewing angle switch 195 is active, the display apparatus 20 operates in a second privacy protection mode, and has a second viewing angle range, and the second viewing angle range is smaller than the first viewing angle range.

In summary, in the backlight module and the display apparatus according to an embodiment of the disclosure, the first prism sheet is disposed between the first light guide plate and the second light guide plate which are disposed overlapping each other. When the display apparatus operates in the sharing mode, the first prism sheet can reflect part of the light emitted from the first bottom surface of the first light guide plate back to the first light guide plate, so as to increase the light energy utilization rate of the first light source. When the display apparatus operates in the privacy protection mode, the first prism sheet can further increase the light collection of the light from the second light guide plate, so as to improve the forward luminance of the display apparatus. In addition, disposing the viewing angle control film between the two light guide plates may effectively reduce the risk that the light emitted by the first light source of the display apparatus is absorbed by the viewing angle control film when the display apparatus operates in the sharing mode, which helps to improve the light energy utilization rate of the backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a first light guide plate, having a first light incident surface, a first bottom surface, and a first light emitting surface, and the first bottom surface and the first light emitting surface being connected to the first light incident surface and opposite to each other;
a first light source, disposed on one side of the first light incident surface of the first light guide plate;
a diffusor, disposed on one side of the first light emitting surface of the first light guide plate;
a second light guide plate, disposed on one side of the first bottom surface of the first light guide plate, the second light guide plate having a second light incident surface, a second bottom surface, and a second light emitting surface, the second bottom surface and the second light emitting surface being connected to the second light incident surface and opposite to each other, and the second light emitting surface facing the first bottom surface;
a second light source, disposed on one side of the second light incident surface of the second light guide plate;
a viewing angle control film, disposed between the first light guide plate and the second light guide plate; and
a first prism sheet, disposed between the viewing angle control film and the first light guide plate.

2. The backlight module according to claim 1, further comprising:
an electronically controlled diffusion film, disposed on the one side of the first light emitting surface of the first light guide plate, and adapted to switch operation between a scattering state and a transparent state.

3. The backlight module according to claim 2, wherein the diffusor is located between the first light guide plate and the electronically controlled diffusion film.

4. The backlight module according to claim 1, wherein a haze value of the diffusor is in a range of greater than or equal to 10% to less than or equal to 95%.

5. The backlight module according to claim 4, wherein the haze value of the diffusor is in the range of greater than or equal to 25% and less than or equal to 75%.

6. The backlight module according to claim 1, wherein the first light incident surface is perpendicular to the second light incident surface.

7. The backlight module according to claim 1, wherein the first prism sheet has a first substrate and a plurality of first prism structures disposed on the first substrate, and an included angle between an extending direction of orthographic projection of each of the first prism structures on the first bottom surface and the first light incident surface is greater than or equal to 60 degrees and less than or equal to 120 degrees.

8. The backlight module according to claim 7, further comprising:
a second prism sheet, disposed between the viewing angle control film and the second light guide plate, the second prism sheet has a second substrate and a plurality of second prism structures disposed on the second substrate, and an included angle between an extending direction of orthographic projection of each of the second prism structures on the first substrate and the extending direction of the orthographic projection of each of the first prism structures on the first substrate being less than or equal to 30 degrees.

9. The backlight module according to claim 8, further comprising:
a third prism sheet, disposed on the one side of the first light emitting surface of the first light guide plate, the third prism sheet having a third substrate and a plurality of third prism structures disposed on the third substrate, and an included angle between an extending direction of orthographic projection of each of the third prism structures on the first light emitting surface and the first light incident surface being less than or equal to 30 degrees.

10. The backlight module according to claim 1, wherein the first light guide plate further has a plurality of first optical microstructures disposed on the first bottom surface, each of the first optical microstructures has a first surface facing the first light source, and a first included angle between the first surface and the first bottom surface is greater than or equal to 3 degrees and less than or equal to 60 degrees, and the second light guide plate further has a plurality of second optical microstructures disposed on the second bottom surface, each of the second optical microstructures has a second surface facing the second light source, and a second included angle between the second surface and the second bottom surface is greater than or equal to 3 degrees and less than or equal to 18 degrees.

11. The backlight module according to claim 10, further comprising:
a third light source, disposed on one side of a third light incident surface of the first light guide plate, the third light incident surface being connected to the first light emitting surface and the first bottom surface, and disposed opposite to the first light incident surface, wherein each of the first optical microstructures further has a third surface facing the third light source, and a third included angle between the third surface and the first bottom surface is greater than or equal to 3 degrees and less than or equal to 60 degrees.

12. The backlight module according to claim 1, wherein the first light guide plate further has a plurality of first columnar structures disposed on the first light emitting surface, and an extending direction of each of the first columnar structures is perpendicular to the first light incident surface.

13. The backlight module according to claim 12, wherein each of the first columnar structures has a height along a normal direction of the first light emitting surface, and has a width along a direction perpendicular to the extending direction of each of the first columnar structures and parallel to the first light emitting surface, and a ratio of the height to the width of each of the first columnar structures is greater than or equal to 0.1.

14. The backlight module according to claim 1, wherein the second light guide plate further has a plurality of second columnar structures disposed on the second light emitting surface, and an extending direction of each of the second columnar structures is perpendicular to the second light incident surface.

15. The backlight module according to claim 14, wherein each of the second columnar structures has a height along a normal direction of the second light emitting surface, and has a width along a direction perpendicular to the extending direction of each of the second columnar structures and parallel to the second light emitting surface, and a ratio of the height to the width of each of the second columnar structures is greater than or equal to 0.1.

16. The backlight module according to claim 1, further comprising:
an electronically controlled viewing angle switch, disposed on the one side of the first light emitting surface of the first light guide plate, and comprising a liquid crystal layer and at least two electrode layers disposed on opposite sides of the liquid crystal layer or at least one electrode layer disposed on one side of the liquid crystal layer.

17. A display apparatus, comprising:
a backlight module, comprising:
a first light guide plate, having a first light incident surface, a first bottom surface, and a first light emitting surface, and the first bottom surface and the first light emitting surface being connected to the first light incident surface and opposite to each other;
a first light source, disposed on one side of the first light incident surface of the first light guide plate;
a diffusor, disposed on one side of the first light emitting surface of the first light guide plate;
a second light guide plate, disposed on one side of the first bottom surface of the first light guide plate, the second light guide plate having a second light incident surface, a second bottom surface, and a second light emitting surface, the second bottom surface and the second light emitting surface being connected to the second light incident surface and opposite to each other, and the second light emitting surface facing the first bottom surface;
a second light source, disposed on one side of the second light incident surface of the second light guide plate;
a viewing angle control film, disposed between the first light guide plate and the second light guide plate; and
a first prism sheet, disposed between the viewing angle control film and the first light guide plate; and
a display panel, disposed on the one side of the first light emitting surface of the first light guide plate and overlapping the first light emitting surface and the second light emitting surface.

18. The display apparatus according to claim 17, wherein the backlight module further comprises:
an electronically controlled diffusion film, disposed between the first light guide plate and the display panel, and adapted to switch operation between a scattering state and a transparent state.

19. The display apparatus according to claim 17, wherein the backlight module further comprises:
an electronically controlled viewing angle switch, disposed between the first light guide plate and the display panel, and comprising a liquid crystal layer and at least two electrode layers disposed on opposite sides of the liquid crystal layer or at least one electrode layer disposed on one side of the liquid crystal layer.

* * * * *